Feb. 4, 1958 J. E. OSTLINE 2,822,424

CALLING DEVICE IDENTIFICATION CAM ASSEMBLY

Filed Dec. 2, 1954

INVENTOR.
JOHN E. OSTLINE
BY [signature]
ATTY.

United States Patent Office 2,822,424

Patented Feb. 4, 1958

2,822,424

CALLING DEVICE IDENTIFICATION CAM ASSEMBLY

John E. Ostline, Chicago, Ill., assignor to General Telephone Laboratories, Incorporated, a corporation of Delaware Application December 2, 1954, Serial No. 472,713

9 Claims. (Cl. 179—90)

Figure 1:
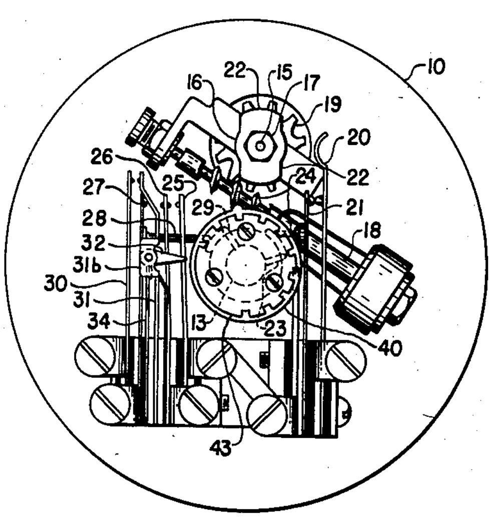

This invention relates to calling devices of the impulse transmitting type and more particularly to improvements in party identification cam arrangements adapted for use in such calling devices. The calling device of the character in which the use of the present invention is contemplated and over which it represents an improved arrangement is well-known in the art and is described, for example, in my Patent No. 2,366,647, issued January 2, 1945. In that patent is shown, in addition to the obvious impulsing and shunting springs, a pair of supplemental impulsing springs operated periodically by a cam affixed to, and rotating with the main dial arbor. The lobe or lobes of said cam are so positioned with respect to the supplemental impulsing spring operating pawl that the latter springs will make contact at a time bearing a predetermined relationship to the contact of the digit impulsing springs as operated by the digit impulse spindle and cam.

It is evident from the arrangement shown in my cited patent that the angular positioning of the supplemental impulsing cam is highly critical if the predetermined relationship referred to is to be accurately maintained. As shown in that patent the positioning is accomplished by shifting the cam lobe or lobes about the axis of the main dial arbor to properly correspond with the timing of the digital impulses. This method of shifting the cam lobes depends for its accuracy of locating the lobes largely upon trial and error and is therefore from the view point of convenience and facility of adjustment, and to that extent, not wholly satisfactory.

Further, party identification cam assemblies of the type embodied in the dialing device of my patent referred to have been limited to the particular telephone systems for which they have been designed. The identification cam assembly of the cited patent, for example, having a maximum of three cam lobes is applicable only to the system described, that is, a system including an exchange in which the party subscriber lines each have a maximum of four party subscriber substations associated therewith. The cam assembly cannot be made readily applicable to a system, for example, having party subscriber lines each of which has ten party subscriber substations associated therewith.

Accordingly, it is the chief object of my invention to provide an identification cam assembly for a calling device in which the cam thereof can be positively and quickly adjusted into an angular position as may be required by the relative position of the impulsing cam of the calling device.

Otherwise stated, it is the object of my invention to provide in a calling device an identification cam assembly in which the cam lobes thereof can be positively and quickly shifted about the cam axis in order to insure the proper timing of the operation of the identification springs with respect to the operation of the digit impulsing springs.

It is another object of my invention to provide in a calling device an identification cam assembly which is universally applicable to telephone systems requiring a supplementary impulse or series of impulses for identification purposes.

A further object of my invention is the provision of a durable cam assembly of the type described in the preceding paragraph which is simple and sturdy in construction and economical to manufacture and the component parts of which are held to a minimum.

Still another object of this invention is to provide a cam assembly of the type described which with a minimum number of operations can be adapted to transmit either none or any number of supplementary identification impulses up to a maximum of ten such impulses as may be required by the system in which the calling device is employed.

Figure 2:
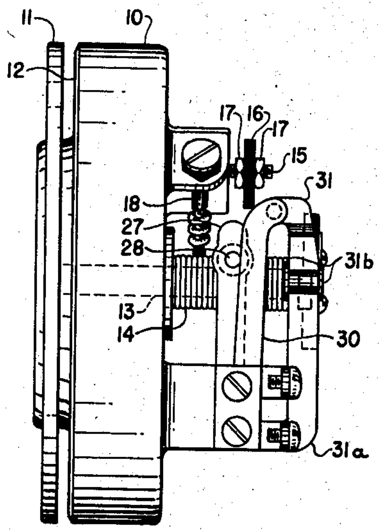
Figure 3:
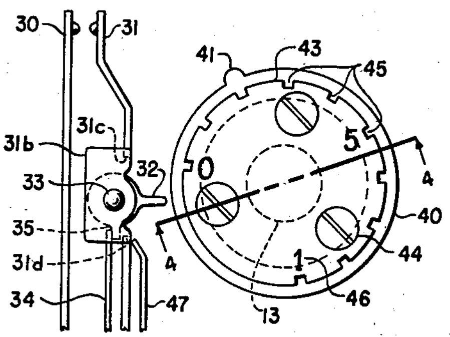
Figure 4:
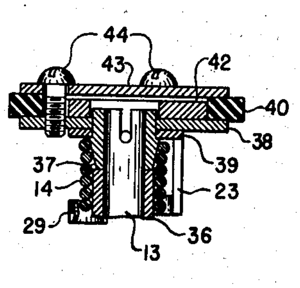

A feature of this invention is a novel cam locating plate having indexing means designed to insure the positive and accurate positioning of the identification cam. Other objects and features of my invention will become apparent from a reading of the detailed description which follows taken in conjunction with the accompanying drawings of which:

Fig. 1 is a plan view of the rear of a dialing device showing the relative positions of the contact springs and the two operating cams, Fig. 2 is a side elevation of the dialing device showing clearly the pair of supplementary impulsing springs and their relation to the main dial arbor operated cam, Fig. 3 is an enlarged plan view of the identification cam assembly showing the supplementary contact springs and cam arrangement, the operating means employed to actuate the springs, and the cam lobe locating means, and Fig. 4 is a sectional view along the line 4—4 of Fig. 3 showing the relative positions of the details of the identification cam assembly.

A dialing device embodying my invention and shown in Figs. 1 and 2 includes a mechanism housing 10 and a finger wheel 11 and dial plate 12 which may be operatively secured to the housing 10 and its contained mechanism (not shown) in a well-known manner. A main arbor 13 rotatably mounted in the housing 10 is rotatable with the finger wheel 11 and carries the identification cam assembly to be described in detail hereinafter. The usual coil spring 14 affixed at one end to the housing 10 and at the other end to the arbor 13 insures the return to a normal position of the finger wheel 11 after it has been rotated a predetermined amount. A spindle 15 extends outside of the housing 10 parallel to the arbor 13 and is controlled by the mechanism to rotate only upon the release of the finger wheel 11 when the finger wheel 11 is permitted to return to its normal position. An impulsing cam 16 is rigidly secured to the spindle 15 in any convenient manner as by the lock nuts 17. A centrifugal governor arrangement 18 mounted on the housing 10 is associated with a gear 19 also rigidly secured on the spindle 15 to maintain the rotational speed of the cam 16 within predetermined limits in a well-known manner.

Mounted on the housing 10 in a conventional manner as by the screw means as shown and appropriately insulated from each other where necessary are a number of operating spring assemblies. Two of these springs, 20 and 21, are impulsing springs operatively associated with a pair of lobes 22 of the impulsing cam 16. An impulse spring control arm 23 rigidly secured to the arbor 13 in a manner to be more specifically described is provided to engage a buffer 24 on the spring 21 to hold the impulse springs 20 and 21 closed and out of engagement with the cam 16 while the finger wheel 11 is in its normal position. Additional springs, 25, 26, and 27, comprise the shunt springs, spring 27 being provided with a buffer 28 which is adapted to cooperate with a shunt spring control arm 29, also rigidly secured to the arbor 13 in a manner to be described later, to hold the shunt springs open while the finger wheel 11 is in its normal position.

A pair of supplementary impulsing springs 30 and 31 completes the group of operating spring assemblies. As most clearly shown in Fig. 2 the spring 30 carries its contact on a slightly off-set portion of the spring. The spring 31 is mounted in the spring pile-up including the shunt springs 25, 26 and 27 by means of a perpendicularly projecting leg 31*a* and is positioned substantially out of the lateral plane of the spring 30 for reasons which will become apparent herein. The contact of the spring 31 is carried on an off-set provided on the spring 31 to meet the off-set portion of the spring 30.

Referring to Fig. 3, the spring 31 is seen to have two parallel, inwardly directed tabs 31*b* between the facing sides of which the spring 31 is cut away as at 31*c* and 31*d*. A pawl 32 pivotally mounted between the tabs 31*b* by means of a pin 33 is held in a normal, non-operated position by means of a flat spring 34 operating against a lug 35. The lug 35 is held flat against the spring 31 by the spring 34 in such a manner as to resist the clockwise rotation of the pawl 32 as viewed in Fig. 3. Obviously counter clockwise rotation is prevented entirely by the contact of the lug 35 against the surface of the spring 31.

Cooperating with the supplementary impulsing springs 30 and 31 is an identification cam assembly mounted on the arbor 13 previously described. The arbor 13 is journalled in a guide bushing 36 affixed to the housing 10. A second bushing 37 mounted on the arbor 13 and rotatable therewith provides a means for securing the impulse spring control arm 29 previously described. The control arms may be affixed to or be integral with a washer 39 which is seated on an annular shoulder provided on the bushing 37, the washer 39 being rotatable with the said bushing 37. Securely supported by the washer 39 and rigidly mounted on the bushing 37 in any convenient manner as by upsetting the upper portion of the bushing 37 is an annular cam mounting plate 38. Concentric with the annular mounting plate 38 and the arbor 13 is an insulated annular cam 40 resting on the plate 38 and the arbor 13 is an insulated annular cam 40 resting on the plate 38 and having a peripheral portion extending beyond the plate 38. A cam lobe 41 is provided on the periphery of the cam 40. Although only one lobe is shown it is to be understood that any number of such lobes may be provided as may be required for identification purposes. An annular cam guide plate 42 also resting on the mounting plate 38 maintains the cam 40 in its concentric relation with the arbor 13 and also provides a surface about which the annular cam 40 may be angularly shifted. A circular cam locating plate 43 resting on the annular cam 40 also concentric with the arbor 13 and the cam 40 completes the identification cam assembly. Maintaining the cam assembly rigidly in the relationship described are the mounting screws 44. In the preferred embodiment of my invention three such screws preferably separated by 120° are found to be satisfactory. The plates 42 and 44 are suitably drilled to slidably pass the mounting screws and the mounting plate 38 is drilled and tapped to admit the screws.

The locating plate 43 is provided with locating means 45 which may comprise peripheral notches as shown in Fig. 3. Thus the cam lobe or lobes 41 may be rotated about the annular cam guide plate 42 to a position or positions directly opposite any one or more of the notches 45. Indicia 46 indicating the notches 45 may be provided on the surface of the plate 43 to facilitate the location of the required lobe position. When the cam lobe 41 of the present embodiment has been shifted to the required position opposite one of the locating notches 45 the screws 44 may be secured thus clamping the annular cam 40 rigidly between the locating plate 43 and the mounting plate 38. The axial dimension of the guide plate 42 is slightly under that of the cam 40 to insure that the locating plate 43 will bear only on the cam 40.

The pawl 32 together with the springs 30 and 31 is so positioned with respect to the identification cam assembly that when the arbor 13 and the cam 40 are rotated far enough in either a clockwise or a counter clockwise direction, the cam lobe 41 will engage the pawl 32. However, when the arbor 13 and cam 40 are rotated in a counter clockwise direction as viewed in Fig. 3, that is, when the finger wheel 11 is rotated from its normal position, the lobe 41 by engaging the pawl 32 causes it to pivot about the pin 33 in a clockwise direction. There will, in this case, be no appreciable effect on the spring 31 since the bias of the spring 34 is not sufficient to prevent the pawl 32 from pivoting by its contact with the lug 35. When the cam 40, on the other hand, is rotated in a clockwise direction as viewed in Fig. 3, that is, when the finger wheel is released after rotation and permitted to return to its normal position, the lobe 41 again engages the pawl 32 but in this case the pawl 32 is prevented entirely from pivoting by the contact of the lug 35 with the spring 31 and the entire spring 31 will be forced into a counter clockwise movement about its mounting and into contact with the spring 30. As soon as the lobe 41 in its clockwise rotation passes the pawl 32 the spring 31 will return to normal, that is, out of contact with the spring 30, by its own spring action. To prevent the spring 31 from returning too far and thereby to prevent any possible contact of the pawl 32 with the cam 40 proper during its rotation an additional flat spring 47 mounted in the same manner as the spring 31 is provided. The spring 47 biases the spring 31 and the pawl 32 only sufficiently to maintain a minimal distance from the cam 40 proper but not enough to cause the springs 30 and 31 to make contact.

Returning now to the operation of the dialing device: as the finger wheel 11 is rotated from its normal position to its extreme rotatable position, that is, to a position corresponding to the "0" digit of a conventional automatic telephone dialing device, the impulse spring control arm 23 is disengaged from the buffer 24 and the closed impulsing springs 20 and 21 are moved into a cooperative relationship with the impulsing cam 16. The shunt spring control arm 29 is also disengaged from the buffer 28 and the shunt springs 25, 26 and 27 are closed. The lobe 41 will engage the pawl 23 but, as previously explained, no operation of the springs 30 and 31 is effected. By the operation of the internal mechanism, not shown, of the housing 10 no rotation of the cam 16 takes place during this rotation of the finger wheel 11. When the finger wheel 11 is released and returned to normal by the tension of the coil spring 14, however, the impulsing cam 16 is caused to rotate, the cam lobes 22 alternately engaging the spring 20 thereby periodically opening the impulse springs 20 and 21 which in turn may periodically open the usual line circuit of an automatic telephone system extending through the impulse springs 20 and 21. The centrifugal governor means 18 maintains a uniform speed of rotation of the impulsing cam 16 thereby insuring uniformity in the timing and length of the impulses thus generated.

The lobe 41 and the cam 40 may be shifted around the guide plate 42 to any desired angular position so that the supplementary impulsing springs 30 and 31 will close at any time with respect to the timing of the opening and the closing of the impulsing springs 20 and 21. In this embodiment of the invention, however, it has been contemplated that the supplementary impulsing springs 30 and 31 be operated alternately with the operation of the impulsing springs 20 and 21. The notches 45, ten in number, are therefore spaced around the periphery of the locating plate 43 and so located that if the cam lobe 41 is shifted to a position opposite any one of the said notches 45 the operation of the supplementary impulsing springs 30 and 31 will fall between the operation of the impulsing springs 20 and 21. The positioning of the lobe 41, for example, as shown in Fig. 3, that is opposite the eighth notch of the cam locating plate 43, will cause the supplementary impulsing springs 30 and 31 to be operated between the eighth and the ninth operation of the impulsing springs 20 and 21. Thus the cam assembly as described herein may be employed in telephone circuit arrangements where it is desired that upon the initial dialing of the digit "0" a single supplementary pulse falling immediately after a selected one of any of the ten digital impulses be generated, the selection of the digit being accomplished merely by shifting the cam lobe opposite any one of the locating means 45. In other circuit arrangements a supplementary series of impulses may be desired to alternate or to coincide with the digital impulses generated and this is readily accomplished by substituting for the cam 40 in the presently considered assembly a cam having a number of lobes corresponding to the number of supplementary impulses desired and then aligning the cam lobes with the locating means 45 to the desired angular position which in turn will determine the timing of the supplementary impulses.

The advantages of the cam assembly according to my invention in which the parts thereof are interchangeable in the degree described are readily apparent in terms of economy and simplicity of manufacture. Thus the only component which will vary in the application of my invention to different telephone systems will be the cam 40 and even here some degree of interchangeability is available. Two cams can thus be used in any installation depending upon the occurrence or non-occurrence of supplementary impulses, the cam 40 having no lobes and the cam 40 having one lobe.

Although that which has been described herein is regarded as the preferred embodiment of my invention it is to be understood that modifications may be made in the operation and structure thereof without departing from the scope of the appended claims.

What is claimed is:

1. In a dialing device, an impulse generator comprising a rotatable shaft, a finger wheel mounted at one extremity of said shaft for manually rotating said shaft, a mounting plate mounted at the other extremity of said shaft and rotatable with said shaft, a cam means adjustably supported on said mounting plate, means for clamping said cam means to said mounting plate, said clamping means having locating indicia thereon, and contact spring means including means cooperating with said cam means for periodically operating said contact spring means, adjustment of said cam means with respect to said mounting plate and to said locating indicia controlling the angle of rotation of said cam means at which said spring means are operated as said shaft and said cam are rotated.

2. In a dialing device, an impulse generator comprising a rotatable shaft, a finger wheel mounted at one extremity of said shaft for manually rotating said shaft, mounting means perpendicularly and concentrically secured at the other extremity of said shaft, a cam concentrically supported by said mounting means, a pair of contact springs associated with said cam, one of said springs having means thereon for cooperating with said cam, a locating plate having indicating means thereon, said cam rotatably adjustable on said mounting means to correspond with any one of said indicating means, means for clamping said cam rigidly between said locating plate and said mounting means after said cam is adjusted, said adjustment of said cam determining the angle of rotation of said cam means at which said contact springs are operated by said cam as said shaft and said cam are rotated.

3. In a dialing device, an impulse generator comprising a rotatable shaft, a finger wheel mounted at one extremity of said shaft, said finger wheel adapted for rotating said shaft a predetermined amount, mounting means secured at the other extremity of said shaft and at right angles to the axis thereof, a cam supported by said mounting means concentrically with said shaft, a pair of impulsing springs associated with said cam, one of said springs having contacting means thereon for cooperating with said cam, a locating plate having indicating means thereon, said cam angularly adjustable with respect to the axis of said shaft on said mounting means to correspond with any one of said indicating means, and means for clamping said cam between said locating plate and said mounting means after said cam is adjusted, said cam engaging said contacting means as said shaft is rotated to thereby operate said impulsing springs at a point in the rotation as controlled by the said angular adjustment of said cam.

4. In a dialing device having a rotatable shaft and a finger wheel for manually rotating said shaft a predetermined amount, mounting means at one extremity of said shaft, a circular guide means supported on said mounting means concentrically with said shaft, an annular cam supported on said mounting means concentric with said shaft, a locating plate having indicating means thereon, said annular cam rotatably adjustable about said circular guide means to correspond with a selected one of said indicating means, means for clamping said annular cam between said locating plate and said mounting means, and impulsing spring means associated with said cam, said means including means for engaging said cam as said shaft and said cam are rotated said predetermined amount whereby said impulsing spring means is operated, the operation of said impulsing spring means with respect to the said predetermined amount of rotation of said shaft being controlled by the said adjustment of said cam with respect to the said indicating means.

5. In a dialing device according to claim 4, said indicating means comprising a sequence of indentations on said locating plate.

6. In an impulse transmitter comprising periodically operable impulsing springs and having a rotatable shaft and a finger wheel for manually rotating said shaft a predetermined amount, a circular mounting means concentrically secured to one extremity of said shaft and perpendicularly to the axis thereof, a circular guide plate concentrically supported on said mounting means, an annular cam associated with said impulsing springs and concentrically supported on said mounting means and rotatable about said circular guide plate, said cam adapted to operate said impulsing springs as said shaft and said cam are rotated, a circular locating plate concentric with said annular cam and having indicating means thereon, said indicating means comprising a sequence of indentations along the periphery of said locating plate, said annular cam adapted to be rotatably adjusted about said guide plate to a position corresponding to a selected one of said indentations, and means for clamping said annular cam between said guide plate and said mounting means, said adjustment of said cam with respect to said indicating means determining the angle of rotation of said cam at which said impulsing springs are operated as said shaft is rotated said predetermined amount.

7. In an automatic telephone dialing apparatus having supplementary impulsing springs and a main dial arbor, a cam assembly for operating said supplementary impulsing springs comprising a mounting plate rigidly secured to said arbor and concentric therewith, a circular guide plate supported on said mounting plate concentric with said main dial arbor, an annular cam associated with said supplementary impulsing springs and concentrically supported on said mounting plate, said cam rotatable about said circular guide plate, a circular locating plate concentric with said main dial arbor and having indicating means along the periphery thereof, said cam rotatably adjustable about said plate to correspond with said indicating means, and means for clamping said annular cam between said locating plate and said mounting plate.

8. In dialing apparatus according to claim 7, including means for maintaining said locating plate in a fixed rotary relation with said mounting plate.

9. In an impulse transmitting device having impulsing springs and a rotatable shaft, a cam assembly comprising a mounting plate secured to the extremity of said shaft, a circular guide plate supported on said mounting plate concentric with said shaft, an annular cam for operating said impulsing springs as said shaft is rotated, said cam supported on said mounting plate and encompassing said guide plate, a circular locating plate concentric with said shaft, said locating plate having a sequence of indentations along the periphery thereof, indicia on said locating plate for designating said indentations, and means passing through said locating plate, said guide plate and said mounting plate for maintaining said plates in a fixed rotary relation, said annular cam rotatably adjustable about said guide plate to locate the operating surface of said cam into alignment with a selected one of said indentations as designated by said indicia, said last-mentioned means also clamping said annular cam between said locating plate and said mounting plate, said location of said operating surface with respect to said locating plate controlling the angle of rotation of said cam at which said impulsing springs are operated.

No references cited.